(12) United States Patent
Pandey et al.

(10) Patent No.: US 10,899,975 B2
(45) Date of Patent: Jan. 26, 2021

(54) INTEGRATED PROCESS FOR MAXIMIZING RECOVERY OF HYDROGEN

(71) Applicant: UOP LLC, Des Plaines, IL (US)

(72) Inventors: Gautam Madhusadan Pandey, Gurgaon (IN); Krishna Mani, Gurgaon (IN); Deepak Bisht, New Delhi (IN); Priyesh Jayendrakumar Jani, Gurgaon (IN); Vikrant Vilasrao Dalal, Gurgaon (IN); Ram Ganesh Rokkam, Gurgaon (IN)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 16/368,247

(22) Filed: Mar. 28, 2019

(65) Prior Publication Data

US 2020/0308496 A1    Oct. 1, 2020

(51) Int. Cl.
| | |
|---|---|
| *C10G 63/04* | (2006.01) |
| *C10G 35/085* | (2006.01) |
| *C10G 35/06* | (2006.01) |
| *C01B 3/26* | (2006.01) |
| *C10G 7/00* | (2006.01) |
| *C10G 65/12* | (2006.01) |

(52) U.S. Cl.
CPC ............... *C10G 63/04* (2013.01); *C01B 3/26* (2013.01); *C10G 7/00* (2013.01); *C10G 35/065* (2013.01); *C10G 35/085* (2013.01); *C10G 65/12* (2013.01); *C10G 2300/104* (2013.01); *C10G 2300/1051* (2013.01); *C10G 2300/1077* (2013.01); *C10G 2300/1096* (2013.01); *C10G 2300/4081* (2013.01); *C10G 2300/42* (2013.01)

(58) Field of Classification Search
None
See application file for complete search history.

(56) References Cited

U.S. PATENT DOCUMENTS

| | | | | |
|---|---|---|---|---|
| 3,264,207 A | * | 8/1966 | Pfefferle | .............. C10G 35/085 |
| | | | | 208/65 |
| 5,026,950 A | | 6/1991 | Schmidt | |
| 2016/0168488 A1 | * | 6/2016 | Eizenga | ................. C10G 59/06 |
| | | | | 208/79 |

FOREIGN PATENT DOCUMENTS

WO    2010074802 A2    7/2010

\* cited by examiner

*Primary Examiner* — Derek N Mueller
(74) *Attorney, Agent, or Firm* — Paschall & Associates, LLC; James C. Paschall (57) ABSTRACT

An integrated process for maximizing recovery of hydrogen is provided. The process comprises: providing a hydrocarbonaceous feed comprising naphtha, and a hydrogen stream to a reforming zone, wherein the hydrogen stream is obtained from at least one of a hydrocracking zone, a transalkylation zone, and an isomerization zone. The hydrocarbonaceous feed is reformed in the reforming zone in the presence of the hydrogen stream and a reforming catalyst to provide a reformate effluent stream. At least a portion of the reformate effluent stream is passed to a debutanizer column of the reforming zone to provide a net hydrogen stream and a fraction comprising liquid petroleum gas (LPG). At least a portion of the net hydrogen stream is recycled to the reforming zone as the hydrogen stream.

20 Claims, 5 Drawing Sheets

INTEGRATED PROCESS FOR MAXIMIZING RECOVERY OF HYDROGEN

FIELD

The field relates to an integrated processes and apparatuses for maximizing recovery of hydrogen. More particularly, the technical field relates to integration of various processes for maximizing recovery of hydrogen.

BACKGROUND

Various catalytic processes are known for converting low value hydrocarbons to high quality petroleum products. One of the widely-employed process is catalytic reforming to produce high quality petroleum products in the gasoline boiling range. Typically, in catalytic reforming, a naphtha boiling range hydrocarbon fraction is passed to a reforming zone wherein it is contacted with a reforming catalyst in the presence of hydrogen. Generally, the catalytic reforming zone effluent comprising gasoline boiling range hydrocarbons is separated to provide gasoline boiling range hydrocarbons. Further, the presence of hydrogen in the catalytic reforming reaction zone is advantageous because the presence of hydrogen, inter alia, helps in suppressing the formation of carbonaceous compounds known as coke on the reforming catalyst. Accordingly, presence of an optimum amount of hydrogen in the catalytic reforming zone is desirable to suppress coke formation over the reforming catalyst. If the reforming process is devoid of the optimum amount of hydrogen, coke formation will take place and decrease the yield of desirable products.

To meet the demand of hydrogen, the recovery of hydrogen from hydrogen-hydrocarbon mixtures is widely used in the petroleum refining and allied industries. Generally, high purity hydrogen is recovered from refinery waste streams comprising hydrogen. The known processes for the recovery of hydrogen from refinery gas streams require complex equipment to separate the hydrogen and for the purification of the hydrogen gas separated from the refinery gas streams. Further, some of the streams need several separation and/or purification steps to recover the hydrogen. However, these streams do not undergo a rigorous or efficient separation steps to recover the hydrogen present therein. These streams are removed as fuel gases from the processes which usually include significant amount of hydrogen and therefore hydrogen present is lost in fuel gas system. Furthermore, processes which employ recovery or separation steps for recovery of hydrogen install various additional columns and/or compressors. Setting up these separation machineries for the recovery of hydrogen from refinery gas streams consume a significant portion of the capital and operating cost and increases the overall cost of the plant.

Accordingly, it is desirable to provide new apparatuses and processes for providing cost benefits in terms of lower capital and operational expenditures. Further, there is a need for an alternative approach for an improved process for hydrogen recovery to meet the demand of petroleum refining and allied industries to produce high quality petroleum products. Furthermore, other desirable features and characteristics of the present subject matter will become apparent from the subsequent detailed description of the subject matter and the appended claims, taken in conjunction with the accompanying drawings and this background of the subject matter.

BRIEF SUMMARY

Various embodiments contemplated herein relate to processes and apparatuses for maximizing recovery of hydrogen. The exemplary embodiments taught herein provide an integrated process for maximizing recovery of hydrogen by integrating various processes.

In accordance with an exemplary embodiment, an integrated process is provided for maximizing recovery of hydrogen comprising a hydrocarbonaceous feed comprising naphtha, and a hydrogen stream to a reforming zone, wherein the hydrogen stream is obtained from at least one of a hydrocracking zone, a transalkylation zone, and an isomerization zone. The hydrocarbonaceous feed is reformed in the reforming zone in the presence of the hydrogen stream and a reforming catalyst to provide a reformate effluent stream. At least a portion of the reformate effluent stream is passed to a debutanizer column of the reforming zone to provide a net hydrogen stream and a fraction comprising liquid petroleum gas (LPG). At least a portion of the net hydrogen stream is recycled to the reforming zone as the hydrogen stream.

In the current integrated process, streams comprising significant amount of hydrogen from processes such as hydrocracking, transalkylation, and isomerization processes are passed to the reforming zone to maximize recovery of hydrogen. Applicants have found that the stripping column overhead streams from the hydrocracking, transalkylation, and isomerization processes can be passed to the reforming zone to maximize recovery of hydrogen while recovering the lower hydrocarbons from these streams in the debutanizer column of the reforming zone. The current integrated process eliminates the use of separate debutanizer column in the hydrocracking zone by integrating the hydrocracking zone with the debutanizer column of the reforming zone. Also, the current integrated process integrates the compressor of the reforming zone with the hydrocracking zone, the transalkylation zone, and the isomerization zone. Accordingly, the current integrated process provides a seamless integration of the hydrocracking zone, the transalkylation zone, the isomerization zone with the reforming zone with reduced capital expenditure and/or operating expenditure of the entire process for maximizing recovery of hydrogen.

These and other features, aspects, and advantages of the present invention will become better understood upon consideration of the following detailed description, drawings and appended claims.

BRIEF DESCRIPTION OF THE DRAWING

The various embodiments will hereinafter be described in conjunction with the following FIGURES, wherein like numerals denote like elements.

DEFINITIONS

As used herein, the term "stream" can include various hydrocarbon molecules and other substances.

As used herein, the term "column" means a distillation column or columns for separating one or more components of different volatilities. Unless otherwise indicated, each column includes a condenser on an overhead of the column to condense the overhead vapor and reflux a portion of an overhead stream back to the top of the column. Also included is a reboiler at a bottom of the column to vaporize and send a portion of a bottom stream back to the bottom of the column to supply fractionation energy. Feeds to the columns may be preheated. The top pressure is the pressure of the overhead vapor at the outlet of the column. The bottom temperature is the liquid bottom outlet temperature. Overhead lines and bottom lines refer to the net lines from the column downstream of the reflux or reboil to the column. Alternatively, a stripping stream may be used for heat input at the bottom of the column.

As used herein, the term "overhead stream" can mean a stream withdrawn in a line extending from or near a top of a vessel, such as a column.

As used herein, the term "bottoms stream" can mean a stream withdrawn in a line extending from or near a bottom of a vessel, such as a column.

The term "$C_{x-}$" wherein "x" is an integer means a hydrocarbon stream with hydrocarbons have x and/or less carbon atoms and preferably x and less carbon atoms.

The term "$C_{x+}$" wherein "x" is an integer means a hydrocarbon stream with hydrocarbons have x and/or more carbon atoms and preferably x and more carbon atoms.

As used herein the term "communication" means that material flow is operatively permitted between enumerated component.

As used herein, the term "direct communication" or "directly" means that flow from the upstream component enters the downstream component without undergoing a compositional change due to physical fractionation or chemical conversion.

As used herein, the term "downstream communication" means that at least a portion of material flowing to the subject in downstream communication may operatively flow from the object with which it communicates.

As used herein, the term "upstream communication" means that at least a portion of the material flowing from the subject in upstream communication may operatively flow to the object with which it communicates.

As used herein, the term "passing" includes "feeding" and "charging" and means that the material passes from a conduit or vessel to an object.

As used herein, the term "separator" means a vessel which has an inlet and at least an overhead vapor outlet and a bottoms liquid outlet and may also have an aqueous stream outlet from a boot. A flash drum is a type of separator which may be in downstream communication with a separator. The separator may be operated at higher pressure than the flash drum.

As used herein, the term "portion" means an amount or part taken or separated from a main stream without any change in the composition as compared to the main stream. Further, it also includes splitting the taken or separated portion into multiple portions where each portion retains the same composition as compared to the main stream.

As used herein, the term "zone" can refer to an area including one or more equipment items and/or one or more sub-zones. Equipment items can include one or more reactors or reactor vessels, heaters, separators, drums, exchangers, pipes, pumps, compressors, and controllers. Additionally, an equipment item, such as a reactor, dryer, or vessel, can further include one or more zones or sub-zones.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description. The Figures have been simplified by the deletion of a large number of apparatuses customarily employed in a process of this nature, such as vessel internals, temperature and pressure controls systems, flow control valves, recycle pumps, etc. which are not specifically required to illustrate the performance of the invention. Furthermore, the illustration of the process of this invention in the embodiment of a specific drawing is not intended to limit the invention to specific embodiments set out herein.

As depicted, process flow lines in the figures can be referred to, interchangeably, as, e.g., lines, pipes, branches, distributors, streams, effluents, feeds, products, portions, catalysts, withdrawals, recycles, suctions, discharges, and caustics.

Figure 1:
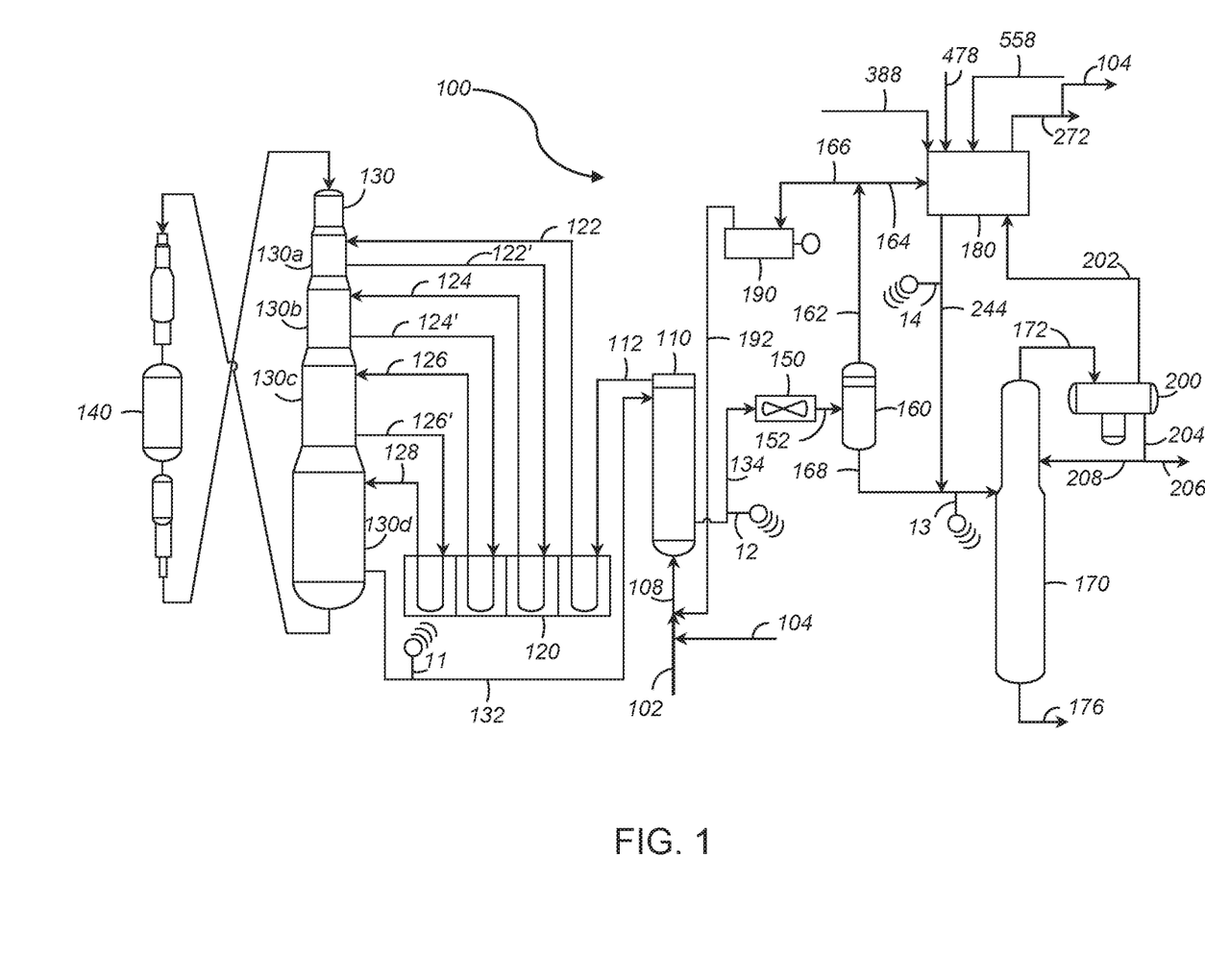
FIG. 1 is a schematic diagram of a process and an apparatus for maximizing recovery of hydrogen in accordance with an exemplary embodiment.

An embodiment of an integrated process for maximizing recovery of hydrogen is addressed with reference to an integrated process and apparatus according to an embodiment as shown in FIG. 1. Referring to FIG. 1, the process and apparatus comprise a reforming zone 100 comprising a reforming reactor 130, an interzone heater 120, a combined feed exchanger 110, a separator 160, a debutanizer column 170, and a compressor 180. As shown in FIG. 1, a hydrocarbonaceous feed comprising naphtha in line 102 is provided to the reforming zone 100. A hydrogen stream is also provided to the reforming zone 100. As described hereinafter in detail, the hydrogen stream may be provided to the debutanizer column 170 of the reforming zone 100 via compressor 180 of the reforming zone 100.

As shown, the hydrocarbonaceous feed comprising naphtha in line 102 may be mixed with the hydrogen stream in line 104 and a recycle gas in line 192 to provide a combined feed stream in line 108. The combined feed stream in line 108 may be heat exchanged with a reformate effluent stream in line 132 in the combined feed exchanger 110 to preheat the combined feed stream. The preheated feed stream in line 112 may be passed to the reforming reactor 130 of the reforming zone 100. As shown, reforming reactor 130 may comprise a plurality of reaction zones 130a, 130b, 130c, and 130d. The reaction zones may be stacked one on top of another for a stacked reactor configuration to form a compact unit that minimizes plot area requirements. Each of the plurality of reaction zones may be adaptable to contain one or more beds of a reforming catalyst. Each of the plurality of reaction zones is in fluid communication with an interzone heater 120 to heat the feed stream to the plurality of reaction zones to a predetermined temperature. Although not shown in FIG. 1, the reactor 130 may comprise single reaction zone having a fixed bed configuration for the reforming catalyst. In another aspect, the reforming zone 100 may comprise a regenerator 140 for continuous regeneration of the spent catalyst. The regenerator 140 in fluid communication with the reforming reactor 130 may be provided for continuous regeneration of the spent catalyst which is sent back to the reaction zones after regeneration.

The hydrocarbonaceous feed may be reformed in the reforming reactor 130 of the reforming zone 100 in the presence of the hydrogen stream and the reforming catalyst to provide a reformate effluent stream. The reaction zones of the reforming reactor 130 may be operated with a feed inlet temperature from about 450° C. to about 540° C. In the reaction zones, reforming reactions take place. The primary reforming reactions convert paraffins and naphthenes of the hydrocarbonaceous feed through dehydrogenation and cyclization to aromatics. The dehydrogenation of paraffins may yield olefins, and the dehydrocyclization of paraffins and olefins may yield aromatics. The reforming process is an endothermic process, and to maintain the reaction, the reforming reactor 130 can be a catalytic reactor that may comprise a plurality of reaction zones with an interzone heater.

As shown, the preheated feed stream in line 112 may be passed to the interzone heater 120 to provide a first heated feed stream in line 122 which may be passed to the first reaction zone 130a. The first reaction zone effluent in line 122' may be passed to the interzone heater 120 to provide a second heated feed stream in line 124. The second heated feed stream in line 124 is passed to the second reaction zone 130b. The second reaction zone effluent in line 124' is passed to the interzone heater 120 to provide a third heated feed stream in line 126. The third heated feed stream in line 126 is passed to the third reaction zone 130c. The third reaction zone effluent in line 126' is passed to the interzone heater 120 to provide a fourth heated feed stream in line 128. The fourth heated feed stream in line 128 is passed to the fourth reaction zone 130d. Thereafter, a reformate effluent stream in line 132 from the fourth reaction zone may be removed and passed to the combined feed exchanger 110 to preheat the combined feed stream. Although, the reforming zone 100 comprises four reaction zones as shown in FIG. 1, reforming zone 100 may comprise more or less reaction zones depending upon the hydrocarbonaceous feed to provide the reformate effluent stream. In an alternate scheme, the reforming reactor 130 may comprise a split-bed configuration of the reaction zones to provide the reformate effluent stream in line 132.

Reforming catalysts generally comprise a metal on a support. The support can include a porous material, such as an inorganic oxide or a molecular sieve, and a binder. Inorganic oxides used for support include, but are not limited to, alumina, magnesia, titania, zirconia, chromia, zinc oxide, thoria, boria, ceramic, porcelain, bauxite, silica, silica-alumina, silicon carbide, clays, crystalline zeolitic aluminasilicates, and mixtures thereof. Reforming catalysts may comprise one or more of Group VIII noble metals. In an exemplary embodiment, the reforming catalyst may comprise one or more of a noble metal selected from platinum, palladium, rhodium, ruthenium, osmium, and iridium. The catalyst can also include a promoter element from Group IIIA or Group IVA. These metals include gallium, germanium, indium, tin, thallium and lead.

At least a portion of the reformate effluent stream may be passed to a debutanizer column 170 of the reforming zone 100 to provide a net hydrogen stream in line 272 and a fraction comprising liquid petroleum gas (LPG) in line 206. Also, a hydrocracked hydrogen stream in line 388, an isomerized hydrogen stream in line 478, and/or a transalkylated hydrogen stream in line 558 may be passed to a compressor 180 to provide a net hydrogen stream in line 272 and the fraction comprising liquid petroleum gas (LPG) in line 206. As shown, the reformate effluent stream in line 132 may be passed to the combined feed exchanger 110 to provide a heat exchanged reformate effluent stream in line 134. The reformate effluent stream in line 134 may be further cooled in a cooler 150 and passed to the separator 160 in line 152. The cooler 150 is optionally used. Accordingly, the reformate effluent stream in line 134 may be passed to the separator 160 without further cooling in the cooler 150. In the separator 160, the reformate effluent stream in line 134 may be separated, perhaps after cooling, to provide a reformate vapor stream in line 162 and a reformate liquid stream in line 168. At least a portion of the reformate vapor stream in line 164 and the hydrocracked hydrogen stream in line 388, the isomerized hydrogen stream in line 478, and/or the transalkylated hydrogen stream in line 558 may be passed to the compressor 180 to provide a compressed liquid stream in line 244 as described hereinafter in detail. In an alternate scheme, the at least portion of the reformate vapor stream and the hydrocracked hydrogen stream in line 388, the isomerized hydrogen stream in line 478, and/or the transalkylated hydrogen stream in line 558 may be combined and passed to the compressor 180 to provide the compressed liquid stream in line 244. As shown in FIG. 1, the compressor 180 is in downstream fluid communication with the hydrocracked hydrogen stream in line 388, the isomerized hydrogen stream in line 478, and/or the transalkylated hydrogen stream in line 558. The compressed liquid stream in line 244 and the reformate liquid stream in line 168 may be passed to the debutanizer column 170 of the reforming zone 100 to provide a debutanizer column overhead stream in line 202 and the fraction comprising LPG in line 206. In the debutanizer column 170, the compressed liquid stream in line 244 and the reformate liquid stream in line 168 are fractionated to provide an overhead vapor stream in line 172. The overhead vapor stream in line 172 may be passed to a receiver 200 of the debutanizer column 170. In the receiver 200, the overhead vapor stream in line 172 may be separated into the debutanizer column overhead stream in line 202 and a receiver liquid stream in line 204. A portion of the receiver liquid stream may be separated as the fraction comprising LPG in line 206. A remaining portion of the receiver liquid stream in line 208 may be recycled to the debutanizer column 170 as a reflux stream in line 208. The debutanizer column overhead stream in line 202 may be passed to the compressor 180. Further, the debutanizer column 170 may produce a debutanizer column bottoms stream in line 176.

Figure 2:
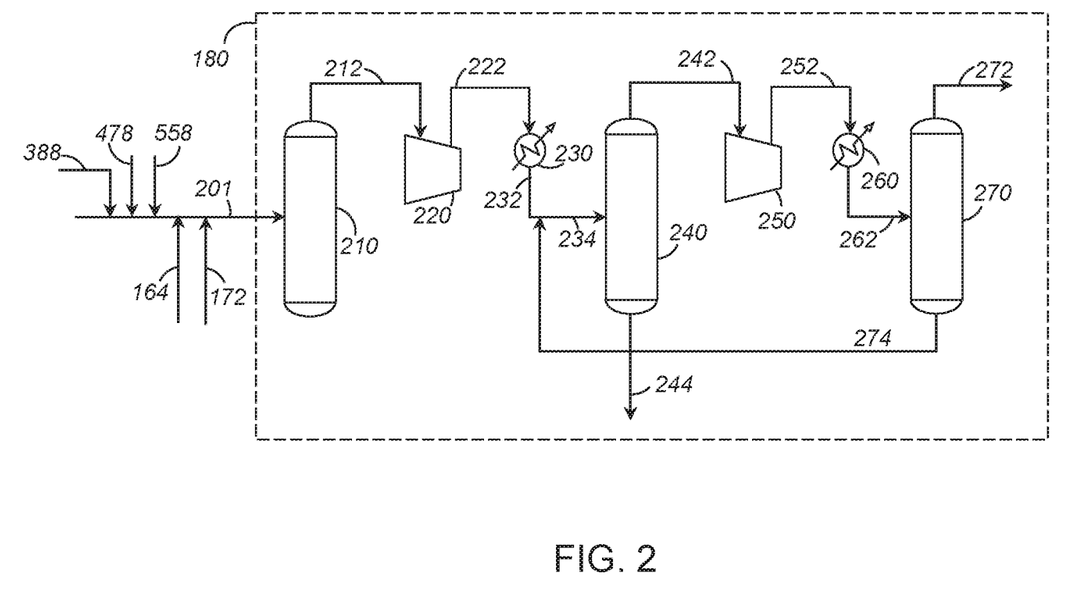
FIG. 2 is a schematic diagram of a compressor as shown in FIG. 1 in accordance with an exemplary embodiment.

An embodiment of the compressor 180 of the reforming zone 100 is addressed with reference to an embodiment as shown in FIG. 2. In an aspect, the compressor 180 may include separator in fluid communication with the compressor to separate any liquid present and to pass the vapor or gas portion of the stream to the next process step. Furthermore, coolers may also be present therein for cooling compressed streams to condense and remove liquid streams. In an exemplary embodiment as shown in FIG. 2, the compressor 180 is a multistage compressor train and the debutanizer column overhead stream in line 202 and the at least portion of the reformate vapor stream in line 164 and the hydrocracked hydrogen stream in line 388, the isomerized hydrogen stream in line 478, and/or the transalkylated hydrogen stream in line 558 may be passed to a first stage compressor 220 of the multistage compressor train 180 to provide the net hydrogen stream in line 272. As shown, the at least portion of the reformate vapor stream in line 164 and the debutanizer column overhead stream in line 202 and the hydrocracked hydrogen stream in line 388, the isomerized hydrogen stream in line 478, and/or the transalkylated hydrogen stream in line 558 may be passed to a surge drum 210. Alternatively, these streams may be combined and a combined stream in line 201 may be passed to the surge drum 210. An overhead stream in line 212 from the surge drum 210 may be removed and passed to the first stage compressor 220 to provide a first compressed stream in line 222. The first compressed stream in line 222 after cooling in a cooler 230 may be passed to a first separator 240 in line 232. As shown, a liquid stream in line 274 may also be combined with the stream in line 232 and passed to the first separator 240 as a combined stream in line 234. In the first separator 240, the first compressed stream may be separated into an overhead vapor stream in line 242 and the compressed liquid stream in line 244. The overhead vapor stream in line 242 may be passed to a second stage compressor 250 for further compressing the overhead vapor stream in line 242. A second compressed stream in line 252 is removed from the second stage compressor 250. Thereafter, the second compressed stream in line 252 may be cooled in a cooler 260 and a cooled compressed stream in line 262 may be passed to a second separator 270. In the second separator 270, the cooled compressed stream in line 262 may be separated to provide a net hydrogen stream in an overhead line 272 and a bottoms liquid stream in line 274. The bottoms liquid stream in line 274 may be passed to the first separator 240 as described herein above. Furthermore, the bottoms liquid stream in line 274 may be passed to line 244. Furthermore, the compressed liquid stream in line 244 from the first separator 240 may be passed to the debutanizer column 170. At least a portion of the net hydrogen stream in line 272 may be recycled to the reforming zone 100 as the hydrogen stream in line 104.

Referring back to FIG. 1, a remaining portion of the reformate vapor stream in line 166 may be passed to a recycle compressor 190. In the recycle compressor 190, the reformate vapor stream in line 166 may be compressed to provide a compressed reformate vapor stream in line 192. The compressed reformate vapor stream in line 192 may be passed as the recycle gas in line 192 to the combined feed exchanger 110 along with the hydrocarbonaceous feed comprising naphtha in line 102 and hydrogen stream in line 104. Although not shown in FIG. 1, the recycle compressor 190 may be operated in a total recycle gas compressor configuration. In this alternative, the entire reformate vapor stream in line 162 may be passed to the recycle compressor 190 to obtain a total compressed reformate vapor stream. A portion of total compressed reformate vapor stream may be passed to the compressor 180 as a reformate vapor stream. A remaining portion of the total compressed reformate stream may be passed as the recycle gas to the combined feed exchanger 110.

The current process provides higher dissolved hydrogen recovery from the hydrocracked hydrogen stream in line 388, the isomerized hydrogen stream in line 478, and/or the transalkylated hydrogen stream in line 558 which generally is lost in fuel gases. By compressing these hydrogen containing streams in the compressor 180 as shown in FIG. 2 and separating the liquid from the compressed streams thereafter ensures the efficient recovery of the dissolved hydrogen and also reduces the loss of hydrogen from these process streams. In this way, the current process maximizes hydrogen recovery across the entire complex by integrating these hydrogen containing streams as shown in FIG. 1. In an exemplary embodiment, the hydrocracked hydrogen stream in line 388, the isomerized hydrogen stream in line 478, and/or the transalkylated hydrogen stream in line 558 may be obtained from a stripper overhead stream in line 388 of a hydrocracking process, a stripper overhead stream in line 478 of an isomerization process, and a stripper overhead stream in line 558 of a transalkylation process, respectively.

Figure 3:
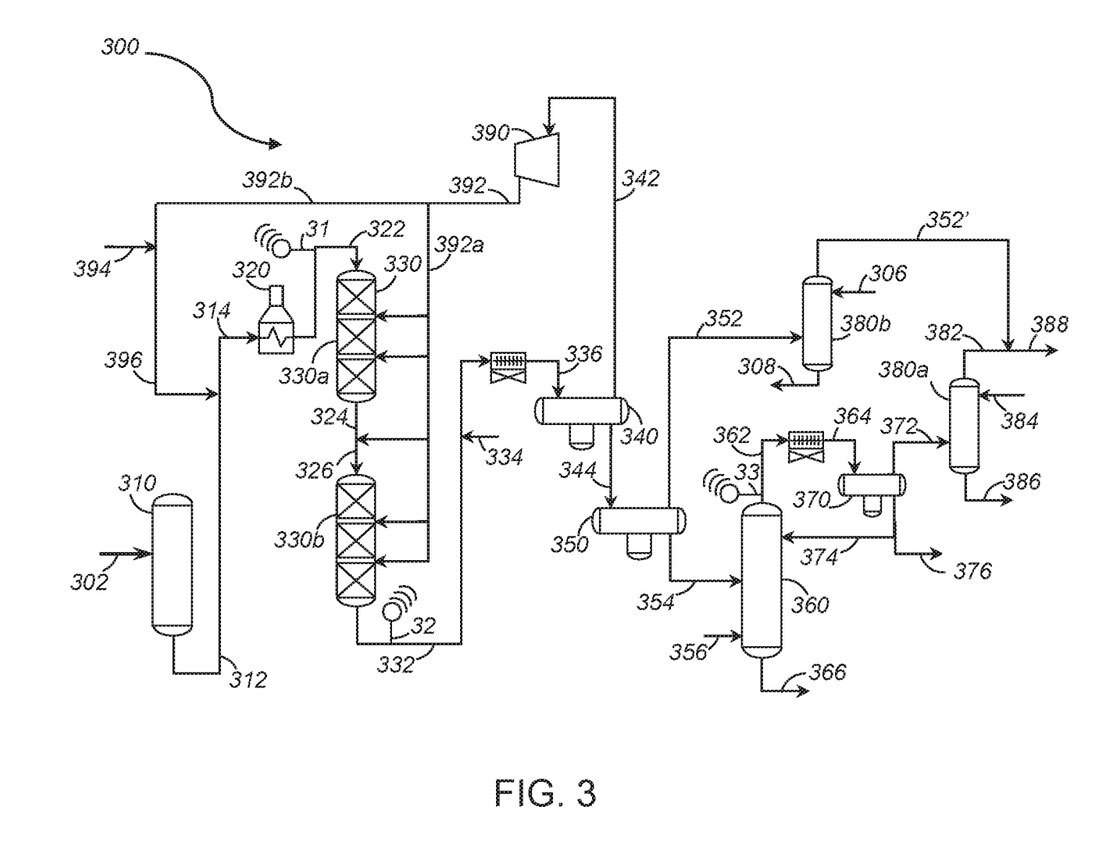
FIG. 3 is a schematic diagram of a process and an apparatus for maximizing recovery of hydrogen in accordance with another exemplary embodiment.

In an exemplary embodiment, the hydrogen stream in line 104 is obtained from an integrated process and apparatus as shown in FIG. 3. Referring to FIG. 3, the process and apparatus comprise a hydrocracking zone 300 including a surge drum 310, a pre-heater 320, a hydrocracking reactor 330, a cold separator 340, a cold flash drum 350, a stripping column 360, and scrubber columns 380a. As shown, a first hydrocarbonaceous feed in line 302 may be passed to the surge drum 310. A bottoms stream in line 312 from the surge drum 310 may be passed to the pre-heater 320 to heat up the first hydrocarbonaceous feed in line 302 to a predetermined temperature. The use of surge drum 310 is optional and the first hydrocarbonaceous feed may be passed to the pre-heater 320 without passing through the surge drum 310. A hydrogen containing stream in line 396 may also be combined with the first hydrocarbonaceous feed and passed to the pre-heater 320 in line 314. The heated first hydrocarbonaceous feed in line 322 may be passed to a hydrocracking reactor 330. Although not shown in FIG. 3, the bottoms stream in line 312 may be preheated by heat exchange with a hydrocracked effluent stream in line 332 in a heat exchanger. Accordingly, the preheated stream may be passed to the charge heater 310 for further heating and passed to hydrocracking reactor 330 in line 322. The first hydrocarbonaceous feed is hydrocracked in the hydrocracking zone 300 in the presence of a hydrocracking catalyst and hydrogen to provide a hydrocracked effluent stream in line 332. In an exemplary embodiment, the hydrocracking zone 300 comprises a two-stage hydrocracking reactor 330. The first hydrocarbonaceous feed is hydrocracked in the two-stage hydrocracking reactor 330 in the presence of the hydrocracking catalyst and the hydrogen to provide the hydrocracked effluent stream in line 332. As shown, the heated first hydrocarbonaceous feed in line 322 may be passed to a first stage hydrocracking reactor 330a wherein the heated first hydrocarbonaceous feed is hydrocracked in the presence of the hydrocracking catalyst and the hydrogen to provide a first stage hydrocracked effluent stream in line 324. The first stage hydrocracking reactor 330a may include one or more beds of hydrocracking catalyst for hydrocracking the heated first hydrocarbonaceous feed.

A hydrogen containing stream in line 392a may also be provided in between the catalyst beds of the hydrocracking reactor 330a to maintain an adequate supply of hydrogen in the first stage hydrocracking reactor 330a for hydrocracking reactions. The first hydrocracked effluent stream in line 324 from the first stage hydrocracking reactor 330a may be passed to a second stage hydrocracking reactor 330b for further hydrocracking the first hydrocracked effluent stream in line 324 to provide a second hydrocracked effluent stream in line 332. The first hydrocracked effluent stream in line 324 may be combined with the hydrogen containing stream in line 392a as shown in FIG. 3 and passed to the second stage hydrocracking reactor 330b in line 326. The second stage hydrocracking reactor 330b may also include one or more beds of hydrocracking catalyst for hydrocracking the first hydrocracked effluent stream. Further, the hydrogen containing stream in line 392a may also be provided between the consecutive catalyst beds of the second stage hydrocracking reactor 330b as shown in FIG. 3 to maintain adequate supply of hydrogen in the second stage hydrocracking reactor 330b for hydrocracking reactions. Although, the hydrocracking zone 300 comprises the two-stage hydrocracking reactor 330 as shown in FIG. 3, the hydrocracking zone 300 may comprise more or less number of stages for hydrocracking the first hydrocarbonaceous feed depending upon the type of feed and the severity of the hydrocracking reactions. The operating conditions of the hydrocracking reactor 330 depend primarily on the type of feed. In an exemplary embodiment, the first hydrocarbonaceous feed comprises one or more of vacuum gas oil (VGO), diesel, light cycle oil (LCO), heavy thermally cracked gas oil, kerosene, vacuum residue, and deasphalted oil (DAO). In another aspect, the hydrocracking zone 300 may be a slurry hydrocracking zone for hydrocracking the first hydrocarbonaceous feed to provide the hydrocracked effluent stream in line 332. In yet another aspect, the hydrocracking reactor 330 may be an ebullated bed hydrocracking reactor.

Suitable hydrocracking catalysts may comprise catalysts that utilize amorphous silica-alumina bases or low-level zeolite bases combined with one or more Group VIII or Group VIB metal hydrogenating components. The zeolite cracking bases are sometimes referred to in the art as molecular sieves and are usually composed of silica, alumina and one or more exchangeable cations such as sodium, magnesium, calcium, rare earth metals, etc. The active metals employed in preferred hydrocracking catalysts as hydrogenation components are those of Group VIII, i.e., iron, cobalt, nickel, ruthenium, rhodium, palladium, osmium, iridium and platinum. In addition to these metals, other promoters may also be employed in conjunction therewith, including the metals of Group VIB, e.g., molybdenum and tungsten.

At least a portion of the hydrocracked effluent stream in line 332 may be separated in a hydrocracking separator to provide a gas stream in line 352 and a liquid stream in line 354. In an exemplary embodiment, the hydrocracking separator comprises a cold separator 340 and a cold flash drum 350. As shown, the hydrocracked effluent stream in line 332 may be cooled in a cooler to provide a relatively cooled hydrocracked effluent stream in line 336. The cooled hydrocracked effluent stream in line 336 may be passed to the cold separator 340. The cooler is optionally used and the hydrocracked effluent stream in line 332 may be passed to the cold separator 340 without further cooling. In the cold separator 340, the hydrocracked effluent stream may be separated into a vapor stream in line 342 and a liquid stream in line 344. A wash water stream in line 334 may also be mixed with the hydrocracked effluent stream in line 332 to absorb any corrosive compounds or salts present therein that might cause plugging. And, the mixed stream may be passed to the cold separator 340 to provide the vapor stream in line 342 and the liquid stream in line 344. The vapor stream in line 342 may be recycled to the hydrocracking reactor 330 as shown in FIG. 3. As shown, the liquid stream in line 344 may be passed to the cold flash drum 350. In the cold flash drum 350, the liquid stream in line 344 may be separated into the gas stream in line 352 and a flashed liquid stream in line 354. The gas stream in line 352 comprises liquid petroleum gas and dissolved hydrogen. In an exemplary embodiment, the gas stream in line 352 comprises hydrogen in an amount from about 50 wt % to about 90 wt %. At least a portion of the liquid stream in line 354 may be stripped in the stripping column 360 to provide a stripped liquid stream in line 366 and a stripping column off-gas stream comprising $C_{6-}$ hydrocarbons in line 372. The liquid stream in line 354 may be passed to the stripping column 360. In the stripping column 360, the liquid stream in line 354 may be stripped with a suitable stripping media to provide a stripped liquid stream in line 366 and an overhead stream in line 362. Any suitable stripping media may be used in the stripping column 360. In an exemplary embodiment, steam in line 356 may be used as stripping media. Steam may be passed in line 356 to the stripping column 360 as shown in FIG. 3. The overhead stream in line 362 may be cooled in a cooler to provide a relatively cooled stream in line 364. The cooled stream in line 364 may be passed to an overhead receiver 370 to provide an overhead liquid stream and the stripping column off-gas stream in line 372 comprising $C_{6-}$ hydrocarbons and dissolved hydrogen. The use of a cooler is optional and the overhead stream in line 362 may be passed to overhead receiver 370 without cooling. Further, at least a portion of the overhead liquid stream may be passed to the stripping column 360 as reflux stream in line 374. The remaining portion of the overhead liquid stream is withdrawn in line 376 for further separation. The stripping column off-gas stream in line 372 may be passed to the scrubber column 380a to remove $H_2S$ present therein.

Conventionally, in the hydrocracking process, the stripping column off gas containing LPG and dissolved hydrogen, after scrubbing, may be passed through a sponge oil absorber to recover LPG range hydrocarbons and then be sent to a fuel gas system without further recovery of hydrogen present therein. In the current process, it is proposed to route the stripping column off-gas stream in line 372 and the gas stream in line 352 comprising dissolved hydrogen to the reforming zone 100 without passing the stripping column off-gas stream in line 372 through the sponge oil absorber and/or any compressor separately for the recovery of dissolved hydrogen present in these streams which is usually lost in fuel gas system. Furthermore, the conventional hydrocracking process employs a separate debutanizer column downstream of the stripping column. The current process also eliminates the use of the separate debutanizer column for the hydrocracking process by integrating the hydrocracking zone 300 with the downstream debutanizer column 170 of the reforming zone 100. Accordingly, the present process eliminates the use of sponge oil absorber and debutanizer column of the hydrocracking zone 300 while maximizing recovery of hydrogen. Also, the present flow scheme provides seamless integration of the reforming zone 100 and the hydrocracking zone 300 via the stripping column overhead of the hydrocracking zone 300 to maximize recovery of hydrogen.

In an aspect, the stripping column off-gas stream comprises hydrogen in an amount from about 50 wt % to about 90 wt %. The stripping column off-gas stream in line 372 may be passed to the scrubber column 380a. In the scrubber column 380a, the stripping column off-gas stream may be washed with an amine solution introduced into the scrubber column in line 384. $H_2S$ present in the stripping column off-gas stream is removed and withdrawn with the stream in line 386 from the scrubber column 380a. Similarly, the gas stream comprising dissolved hydrogen in line 352 may also be subjected to a suitable method to remove any contaminants present therein and thereafter passed to the compressor 180 of the reforming zone 100. In an exemplary embodiment, the gas stream comprising dissolved hydrogen in line 352 may be passed to a scrubber column 380b to remove the contaminants present therein. The gas stream in line 352 may be washed with an amine solution introduced into the scrubber column in line 306. Contaminants present in the gas stream in line 352 are removed and withdrawn with the stream in line 308 from the scrubber column 380b. A treated stripping column off-gas stream in line 382 and a treated gas stream in line 352' comprising dissolved hydrogen may be combined and a combined stream in line 388 may be passed as the hydrocracked hydrogen stream to the compressor 180 of the reforming zone 100 as shown in FIG. 1 to obtain the net hydrogen stream in line 272. At least a portion of the net hydrogen stream in line 272 may be recycled to the reforming zone 100 as the hydrogen stream in line 104. The need for the scrubbing step depends on the amount of sulfur present in the stripping column off-gas stream in line 372. Further, the treated stripping column off-gas stream in line 382 and the treated gas stream in line 352' may be passed to the compressor 180 separately. In an alternate scheme, at least a portion of the stripping column off-gas stream in line 372 may be passed directly to the compressor 180 of the reforming zone to obtain the net hydrogen stream in line 272. The compressor 180 of the reforming zone 100 is in downstream fluid communication with the hydrocracking zone 300. In an exemplary embodiment, the compressor 180 of the reforming zone 100 is in downstream fluid communication with the hydrocracking zone 300 via the treated stripping column off-gas stream in line 382 and the treated gas stream in line 352'. In the compressor 180, the stripping column off-gas stream comprising $C_{6-}$ hydrocarbons in line 372 and the gas stream comprising dissolved hydrogen in line 352 are compressed to obtain the net hydrogen stream in line 272 as described herein above. The need for the scrubbing step depends on the amount of contaminants present in the gas stream in line 352. Accordingly, the gas stream comprising dissolved hydrogen in line 352 may be passed to the compressor 180 of the reforming zone 100 without scrubbing in the scrubber column 380b.

The vapor stream in line 342 from the cold separator 340 may comprise hydrogen along with other hydrocarbons that may be recycled for hydrocracking. As shown in FIG. 3, the vapor stream in line 342 may be passed to a recycle gas compressor 390. A compressed gas stream in line 392 may be removed from the recycle gas compressor 390. A portion of the compressed gas stream in line 392a may be passed to the hydrocracking zone 300 as hydrogen containing stream as described herein above. Further, the remaining portion of the compressed gas stream in line 392b may be combined with a makeup hydrogen stream in line 394 to provide the hydrogen containing stream in line 396 and passed to the hydrocracking zone 300 as described herein above.

The current process of integrating the hydrocracking zone 300 and the reforming zone 100 reduces capital expenditure and/or operating expenditure of the process by integrating the debutanizer column 170 of the reforming zone 100 with the hydrocracking zone 300 via the stripping column overhead stream in line 372 of the hydrocracking zone 300 while eliminating the sponge oil absorber and the debutanizer column of the hydrocracking zone 300 for maximizing recovery of hydrogen. Accordingly, the current process avoids the use of additional columns present in the conventional hydrocracking process. Also, the present scheme uses a single compressor or compressor train of the reforming zone 100 to integrate the hydrocracking zone 300 with the reforming zone 100 to maximize recovery of hydrogen.

Figure 4:
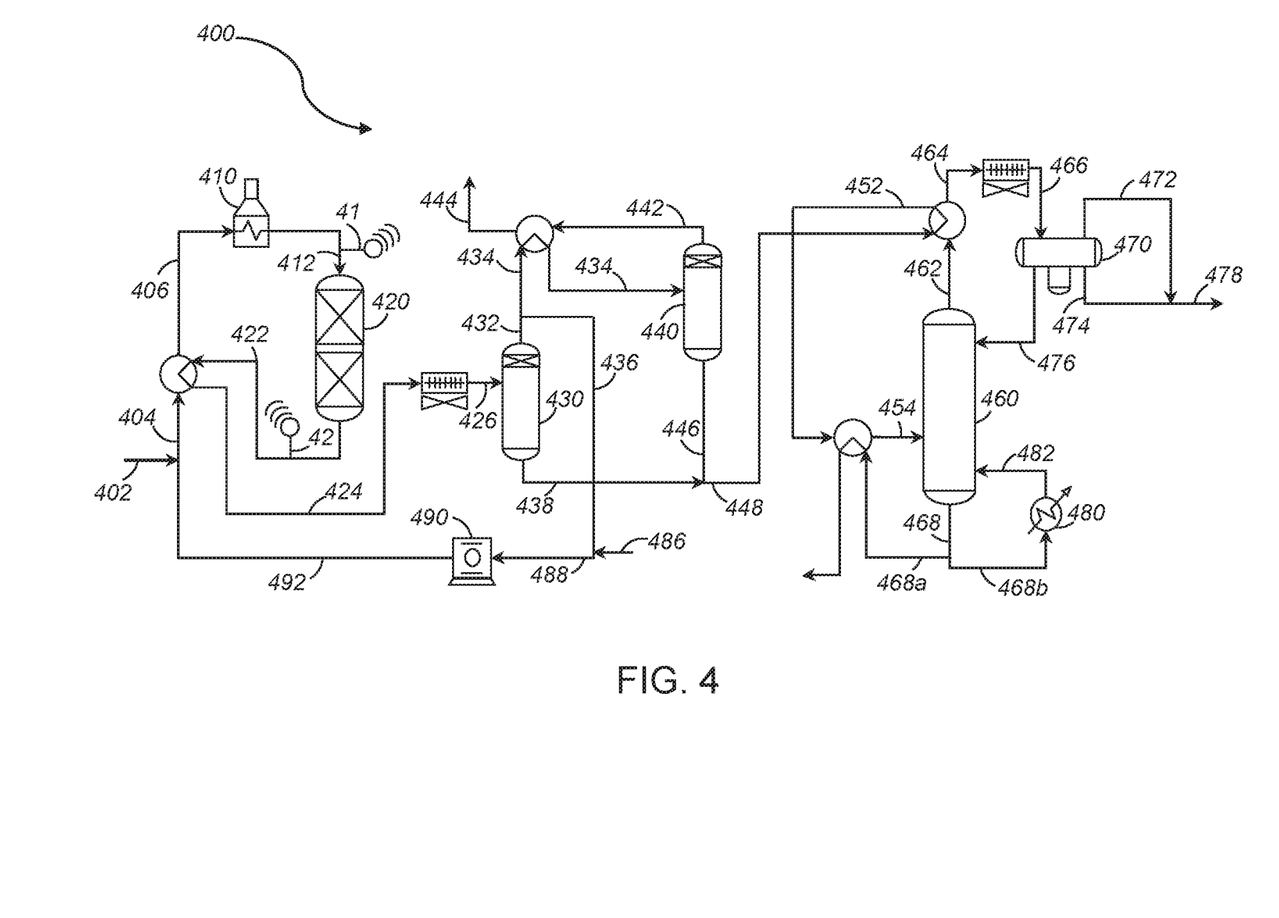
FIG. 4 is a schematic diagram of a process and an apparatus for maximizing recovery of hydrogen in accordance with yet another exemplary embodiment.

In another exemplary embodiment, the hydrogen stream in line 104 is obtained from an integrated process and apparatus as shown in FIG. 4. Referring to FIG. 4, the process and apparatus comprise an isomerization zone 400 including a charge heater 410, an isomerization reactor 420, a hot separator 430, a cold separator 440, and a stripping column 460. As shown in FIG. 4, a p-xylene lean stream in line 402 may be passed to the isomerization zone 400. The p-xylene lean stream is isomerized in the isomerization zone in the presence of an isomerization catalyst and hydrogen to provide an isomerized effluent stream in line 422. In accordance with an exemplary embodiment, the p-xylene lean stream may be obtained from a hydrocarbonaceous feed stream comprising $C_{8+}$ hydrocarbons. The hydrocarbonaceous feed stream comprising $C_{8+}$ hydrocarbons may be passed to a xylene column. In the xylene column, the hydrocarbonaceous feed stream may be separated to provide an overhead stream comprising a mixture of xylenes and a bottoms stream comprising $C_{9+}$ hydrocarbons. From the mixture of xylenes, p-xylene may be separated by adsorption or any efficient method to provide the p-xylene lean stream. In an aspect, the p-xylene lean stream comprises less than 1 wt % p-xylene. As shown in FIG. 4, the p-xylene lean stream in line 402 may be combined with a hydrogen containing stream in line 492 and a combined stream in line 404 may be passed to the charge heater 410 to heat the p-xylene lean stream and the hydrogen containing stream to a predetermined temperature. Also, the combined stream in line 404 may be preheated by heat exchange with the isomerized effluent stream in line 422 in a heat exchanger. The preheated stream in line 406 may be passed to the charge heater 410 for further heating and passed to the isomerization reactor 420 in line 412. In the isomerization reactor 420 the p-xylene lean stream is isomerized in the presence of the isomerization catalyst and hydrogen to provide the isomerized effluent stream in line 422. The isomerization reactor 420 may include one or more beds of isomerization catalyst for isomerizing the p-xylene lean stream. Any suitable isomerization catalyst may be used in the isomerization reactor 420 for isomerizing the p-xylene lean stream.

Typical isomerization catalysts contain a catalytically-effective amount of molecular sieve and a catalytically-effective amount of one or more hydrogenation metal components. Examples of molecular sieves include the MFI, MEL, EUO, FER, MFS, MTT, MTW, TON, MOR, UZM-8 and FAU types of zeolites. Pentasil zeolites such as MFI, MEL, MTW and TON are preferred, and MFI-type zeolites, such as ZSM-5, silicalite, Borolite C, TS-1, TSZ, ZSM-12, SSZ-25, PSH-3, and ITQ-1 are especially preferred. The catalysts may contain hydrogenation metal components and may contain suitable binder or matrix material such as inorganic oxides and other suitable materials. A refractory binder or matrix is typically used to facilitate fabrication of the isomerization catalyst, provide strength and reduce fabrication costs. The binder should be uniform in composition and relatively refractory to the conditions used in the process. Suitable binders include inorganic oxides such as one or more of alumina, aluminum phosphate, magnesia, zirconia, chromia, titania, boria and silica.

The isomerized effluent stream in line 422 may be passed to the stripping column to provide an overhead stream comprising $C_{7-}$ hydrocarbons in line 462 and a bottoms stream comprising $C_{8+}$ hydrocarbons in line 468. As shown, the isomerized effluent stream in line 422 may be cooled in the heat exchanger with the p-xylene lean stream. A heat exchanged isomerized effluent stream in line 424 may be further cooled in a cooler and passed to the hot separator 430 in line 426 for separation. Suitable operating conditions of the hot separator 430 include, for example, a temperature of about 260° C. to 320° C. The hot separator 430 may be operated at a slightly lower pressure than the isomerization reactor 420 accounting for pressure drop of intervening equipment. In the hot separator 430, the isomerized effluent stream in line 422 may be separated to provide an overhead vapor stream in line 432 and a bottoms liquid stream in line 438. Although not shown in FIG. 4, the hot separator 430 may have a corresponding flash drum and the bottoms liquid stream in line 438 may be let down in pressure and flashed in a hot flash drum. A portion of the overhead vapor stream in line 436 may be recycled to the isomerization reactor 420. As shown, a makeup hydrogen stream in line 486 may also be combined with the recycle overhead vapor stream in line 436 and passed to a recycle gas compressor 490 in line 488 to provide the hydrogen containing stream in line 492. The hydrogen containing stream in line 492 may be passed to the isomerization reactor 420. A remaining portion of the overhead vapor stream in line 434 may be cooled in a heat exchanger and passed to the cold separator 440. Alternatively, the overhead vapor stream in line 434 may be passed to the cold separator 440 without further cooling in the heat exchanger. In the cold separator 440 the vapor stream in line 434 may be separated into an overhead vapor stream in line 442 and a bottoms liquid stream in line 446. Suitable operating conditions of the cold separator 440 include, for example, a temperature of about 20° C. to about 60° C. and below the pressure of the isomerization reactor 420 and the hot separator 430 accounting for pressure drop of intervening equipment. Although not shown in FIG. 4, the cold separator 440 may have a corresponding flash drum and the bottoms liquid stream in line 446 may be let down in pressure and flashed in a cold flash drum. The overhead vapor stream in line 442 after passing through the heat exchanger may be removed as a purge gas in line 444.

The bottoms liquid stream in line 446 from the cold separator 450 and the bottoms liquid stream in line 438 from the hot separator 430 may be combined. A combined stream in line 448 may be passed to the stripping column 460 to provide the overhead stream comprising $C_{7-}$ hydrocarbons and the bottoms stream comprising $C_{8+}$ hydrocarbons. As shown, the combined stream in line 448 may be heat exchanged in a heat exchanger and passed to the stripping column 460 in line 454. Any suitable stripping media may be used in the stripping column 460. In an exemplary embodiment, steam may be used as stripping media instead of using a reboiler 480. In the stripping column 460, the combined stream in line 448 may be stripped off the heavy hydrocarbons with the stripping media to provide the overhead stream comprising $C_{7-}$ hydrocarbons in line 462 and the bottoms stream comprising $C_{8+}$ hydrocarbons in line 468. In an aspect, the stripping column 460 is a deheptanizer column. Accordingly, the isomerized effluent stream may be passed to a deheptanizer column 460 to provide the overhead stream comprising $C_{7-}$ hydrocarbons in line 462 and the bottoms stream comprising $C_{8+}$ hydrocarbons in line 468. In an aspect, the stripping column overhead stream comprises hydrogen in an amount from about 2 wt % to about 10 wt %. As shown, the overhead stream comprising $C_{7-}$ hydrocarbons in line 462 may be heat exchanged in the heat exchanger with the combined stream in line 448 to provide a heat exchanged overhead stream in line 464. The heat exchanged overhead stream in line 464 may be further cooled in a cooler and passed to the receiver 470 of the stripping column 460 in line 466. The cooler is optionally used and the overhead stream in line 464 may be passed to the receiver 470 without further cooling in the cooler.

In the receiver 470, the overhead stream comprising $C_{7-}$ hydrocarbons in line 462 may be separated into liquid and vapor. At least a portion of the overhead stream comprising $C_{7-}$ hydrocarbons may be compressed to obtain the hydrogen stream in line 104. A portion of the liquid in line 476 may be passed to the stripping column 460 as reflux stream. Another portion of the liquid in line 474 and a vapor stream in line 472 may be passed to the reforming zone 100 for hydrogen recovery. The liquid stream in line 474 and the vapor stream in line 472 may be combined and passed in line 478 to the compressor 180 of the reforming zone as the isomerized hydrogen stream to provide the net hydrogen stream in line 272. At least a portion of the net hydrogen stream in line 272 may be recycled to the reforming zone 100 as the hydrogen stream in line 104. In an alternate scheme, at least a portion of the overhead stream comprising $C_{7-}$ hydrocarbons in line 462 may be passed directly to the compressor 180 of the reforming zone 100 to obtain the net hydrogen stream in line 272. As shown in FIG. 1, the isomerized hydrogen stream in line 478 is compressed in the compressor 180 to obtain the net hydrogen stream in line 272. In an alternate scheme, the liquid stream in line 474 and the vapor stream in line 472 may be passed to the compressor 180 separately. The compressor 180 of the reforming zone 100 is in downstream fluid communication with the isomerization zone 400. In an exemplary embodiment, the compressor 180 of the reforming zone 100 is in downstream fluid communication with the isomerization zone 400 via the liquid stream in line 474 and the vapor stream in line 472.

Typically, the isomerization zone includes a debutanizer column downstream of stripping column for recovery of lower hydrocarbons. This debutanizer column is sometimes provided with a vent condenser or a chiller to recover lower hydrocarbons from off gas without recovering the dissolved hydrogen. Accordingly, the hydrogen present or dissolved is lost in fuel gas streams. Applicants have found that instead of placing a dedicated debutanizer column for isomerization process, the overhead stream from stripping column may passed to the reforming zone to maximize recovery of hydrogen along with lower hydrocarbons in the debutanizer column of the reforming zone. Therefore, the current process eliminates the use of an additional debutanizer column for the isomerization zone while maximizing recovery of hydrogen as shown in FIG. 1. Thereby, the present process reduces the capital expenditure and/or the operating expenditure of the entire process by integrating the debutanizer column 170 of the reforming zone 100 with the stripping column 460 of the isomerization zone while eliminating the dedicated debutanizer column for the isomerization zone 400 to maximize recovery of hydrogen.

Figure 5:
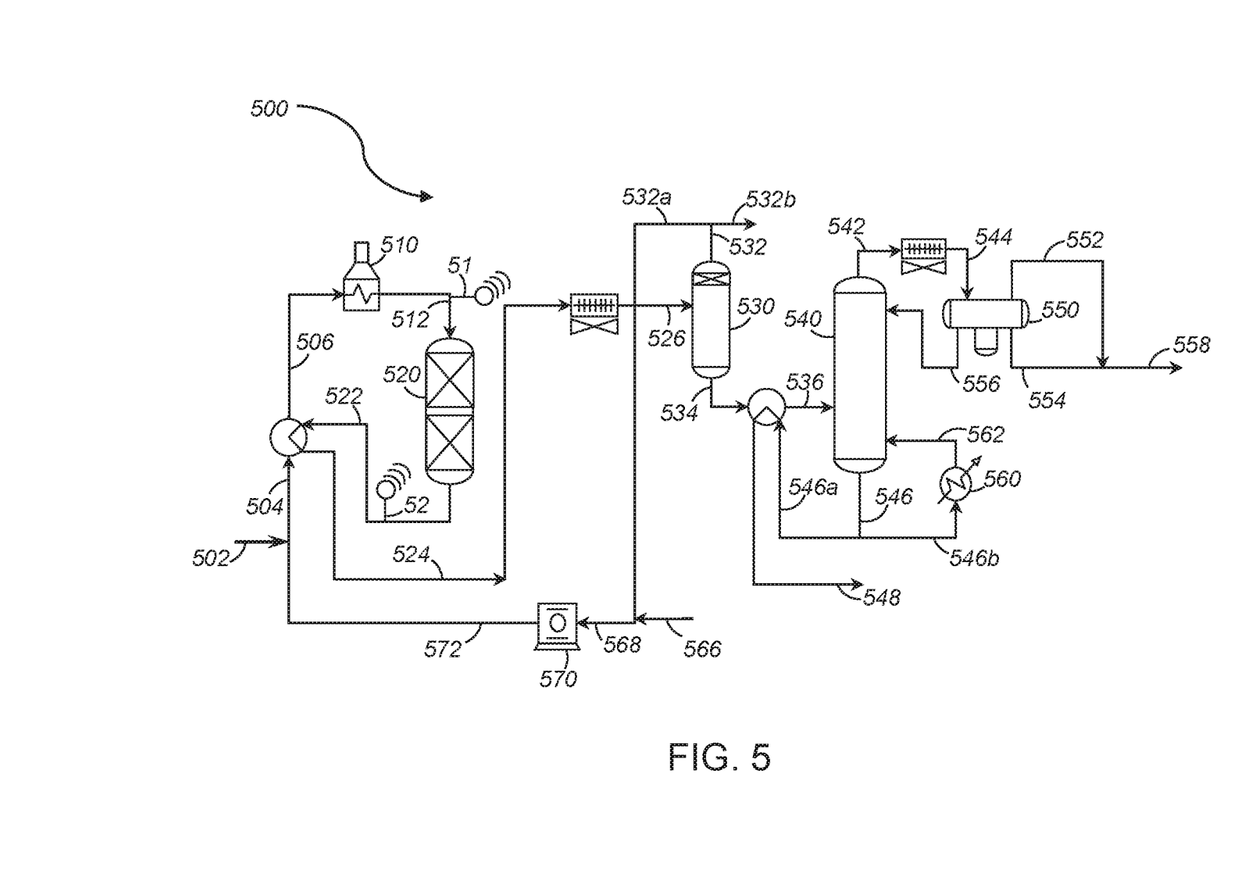
FIG. 5 is a schematic diagram of a process and an apparatus for maximizing recovery of hydrogen in accordance with still another exemplary embodiment.

In yet another exemplary embodiment, the hydrogen stream in line 104 is obtained from an integrated process and apparatus as shown in FIG. 5. Referring to FIG. 5, the process and apparatus comprise a transalkylation zone 500 including a charge heater 510, a reactor 520, a separator 530, and a stripping column 540. As shown, a hydrocarbonaceous feed comprising $C_{7+}$ hydrocarbons in line 502 may be passed to the transalkylation zone 500 comprising a transalkylation catalyst to produce a transalkylation zone effluent stream in line 522. As shown, the hydrocarbonaceous feed comprising $C_{7+}$ hydrocarbons in line 502 may be combined with a hydrogen containing stream in line 572. A combined stream in line 504 may be passed to the reactor 520. The combined stream in line 504 may be heat exchanged in a heat exchanger with the transalkylation zone effluent stream in line 522 to preheat the combined stream in line 504. In an alternate scheme, the transalkylation zone 500 may also comprise a feed surge drum. Accordingly, the hydrocarbonaceous feed comprising $C_{7+}$ hydrocarbons in line 502 may be passed to a feed surge drum and thereafter passed to the reactor 520. A preheated combined stream in line 506 may be passed to the charge heater 510 to raise the temperature of the combined stream in line 506 to a predetermined temperature and passed to the reactor 520 in line 512. In the reactor 520, the hydrocarbonaceous feed comprising $C_{7+}$ hydrocarbons is subjected to transalkylation reactions in the presence of the transalkylation catalyst to produce the transalkylation zone effluent stream in line 522. Under the given reaction conditions in the reactor 520, toluene and heavy aromatics of the hydrocarbonaceous feed may react and a mixture of xylenes plus ethylbenzene is produced. The reactor 520 may include one or more beds of the transalkylation catalyst to produce the transalkylation zone effluent stream. Any suitable transalkylation catalyst may be used in the reactor 520 to produce the transalkylation zone effluent stream in line 522.

The transalkylation catalysts that may be used are based on a solid-acid material combined with a metal component. Suitable solid-acid materials include all forms and types of mordenite, mazzite (omega zeolite), beta zeolite, ZSM-11, ZSM-12, ZSM-22, ZSM-23, MFI type zeolite, NES type zeolite, EU-1, MAPO-36, MAPSO-31, SAPO-5, SAPO-11, SAPO-41, silica-alumina mixtures thereof or ion exchanged versions of such solid-acids. Refractory inorganic oxides, combined with the above-mentioned catalysts are usually found useful in transalkylation process. A refractory binder or matrix is optionally utilized to facilitate fabrication of the catalyst, provide strength and reduce fabrication costs. The binder should be uniform in composition and relatively refractory to the conditions used in the process. Suitable binders include inorganic oxides such as one or more of alumina, magnesia, zirconia, chromia, titania, boria, thoria, phosphate, zinc oxide and silica. Alumina is a preferred binder. The catalyst may optionally contain additional modifier metal components. Preferred metal modifier components of the catalyst include, for example, tin, germanium, lead, indium, platinum, palladium and mixtures thereof.

The transalkylation zone effluent stream in line 522 may be removed and cooled by heat exchange in the heat exchanger with the combined stream in line 504. At least a portion of the transalkylation zone effluent stream in line 522 may be stripped in the stripping column 540 to provide a stripping column overhead stream in line 542 and a stripping column bottoms stream in line 546. As shown, the transalkylation zone effluent stream may be further cooled in a cooler and passed to the separator 530 in line 526. The separator 530 may operate at a pressure below the pressure of the reactor 520 accounting for pressure drop of intervening equipment. In the separator 530, a transalkylation zone effluent stream may be separated to provide a vapor stream in line 532 and a bottoms liquid stream in line 534. A portion of the vapor stream in line 532*b* may be removed as a purge stream. The remaining portion of the vapor stream in line 532*a* may be recycled to the reactor 520. Although not shown in FIG. 5, the separator 530 may have a corresponding flash drum and the bottoms liquid stream in line 534 may be let down in pressure and flashed in a flash drum. The bottoms liquid stream in line 534 may be passed to the stripping column 540 to provide the stripping column overhead stream in line 542 and the stripping column bottoms stream in line 546. As shown, the bottoms liquid stream in line 534 may be heat exchanged in a heat exchanger with a stripping column bottoms stream in line 546*a* and passed to the stripping column 540 in line 536. However, the bottoms liquid stream in line 534 may be passed to the stripping column 540 without heat exchange in the heat exchanger. In the stripping column 540, the bottoms liquid stream in line 534 may be stripped with a stripping media to provide the stripping column overhead stream in line 542 and the stripping column bottoms stream in line 546 instead of using a reboiler 560. Any suitable stripping media may be used in the stripping column 540. The stripping column overhead stream in line 542 may be cooled in a cooler and passed to a receiver 550 in line 544. In an aspect, the stripping column overhead stream comprises hydrogen in an amount from about 2 wt % to about 10 wt %. In the receiver 550, the stripping column overhead stream may be separated into liquid and vapor. A liquid stream in line 556 may be passed to the stripping column 540 as a reflux stream. Another liquid stream in line 554 and a vapor stream in line 552 may be passed to the reforming zone for hydrogen recovery. The liquid stream in line 554 and the vapor stream in line 552 may be combined and a combined stream in line 558 may be passed as the transalkylated hydrogen stream to the compressor 180 of the reforming zone 100 to obtain the net hydrogen stream in line 272. At least a portion of the net hydrogen stream in line 272 may be recycled to the reforming zone 100 as the hydrogen stream in line 104. In an alternate scheme, at least a portion of the stripping column overhead stream in line 542 may be passed directly to the compressor 180 of the reforming zone 100 to obtain the net hydrogen stream in line 272. As shown in FIG. 1, the transalkylated hydrogen stream in line 558 may be compressed in the compressor 180 to obtain the net hydrogen stream in line 272. In another scheme, the liquid stream in line 554 and the vapor stream in line 552 may be passed to the compressor separately. The compressor 180 of the reforming zone 100 is in downstream fluid communication with the transalkylation zone 500. In an exemplary embodiment, the compressor 180 of the reforming zone 100 is in downstream fluid communication with the transalkylation zone 500 via the liquid stream in line 554 and the vapor stream in line 552.

In a conventional transalkylation process, the stripping column off gases, after removing the lower hydrocarbons, are sent to fuel gas system. Therefore, hydrogen present or dissolved is not recovered and lost in fuel gas system. However, the applicants have found that the transalkylation zone 500 can be integrated with the reforming zone 100 via the stripping column overhead stream in line 542 of the transalkylation zone 500 to maximize recovery of hydrogen. Accordingly, the stripping column overhead stream in line 542 is passed to the compressor 180 of the reforming zone 100 to compress the stripping column overhead stream along with the other process streams to maximize recovery of hydrogen. Also, lower hydrocarbons are recovered from the debutanizer column 170 of the reforming zone 100. Thereby, the current process allows seamless integration of the transalkylation zone 500 with the reforming zone 100 via the stripping column overhead stream in line 542 to maximize recovery of hydrogen. Further, the integrated process eliminates the use of an intervening compressor that conventionally is used in the transalkylation zone 500.

Generally, fuel gas streams produced from the hydrocracking process, the isomerization process, and the transalkylation process, are removed and passed to their respective fuel gas system without further recovery of the components present therein. Applicants have found that these streams may contain a substantial amount of hydrogen and therefore can be used for hydrogen recovery. Accordingly, the present process provides integration of the hydrocracking zone 300, the isomerization zone 400, and/or the transalkylation zone 500 via hydrogen containing streams with the reforming zone 100 to maximize the recovery of hydrogen. Also, the current process avoids the use of intervening equipment such as a debutanizer column and a recycle compressor that are used in the conventional hydrocracking process, isomerization process, and transalkylation process by integration of these processes via hydrogen containing streams with the compressor 180 of the reforming zone 100 to maximize recovery of hydrogen.

Further, by integrating the hydrocracking zone 100, the isomerization zone 400, and the transalkylation zone 500 with the reforming zone 100 via compressor 180, the current process eliminates the need for separate compressors present in aforesaid zones while maximizing recovery of hydrogen as described herein above. The current process also eliminates the use of a separate hydrogen recovery units comprising various compressors and separators for each of the reforming zone 100, the isomerization zone 400, and the transalkylation zone 500 and integrates these zones by using a single compressor 180 or compressor train 180 of the reforming zone 100 via the hydrocracked hydrogen stream in line 388 from the hydrocracking zone 100, the isomerized hydrogen stream in line 478 from the isomerization zone 400, and the transalkylated hydrogen stream in line 558 from the transalkylation zone 500 to maximize recovery of hydrogen as shown in FIG. 1, FIG. 2, FIG. 3, FIG. 4, and FIG. 5.

Any of the above lines, conduits, units, devices, vessels, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect. Further, the figure shows one or more exemplary sensors such as 11, 12, 13, 14, 31, 32, 33, 41, 42, 51, and 52 located on one or more conduits. Nevertheless, there may be sensors present on every stream so that the corresponding parameter(s) can be controlled accordingly.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring component, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

Specific Embodiments

While the following is described in conjunction with specific embodiments, it will be understood that this description is intended to illustrate and not limit the scope of the preceding description and the appended claims.

A first embodiment of the invention is a process for maximizing recovery of hydrogen comprising providing a hydrocarbonaceous feed comprising naphtha, and a hydrogen stream to a reforming zone, wherein the hydrogen stream is obtained from at least one of a hydrocracking zone, an isomerization zone, and a transalkylation zone; reforming the hydrocarbonaceous feed in the reforming zone in the presence of the hydrogen stream and a reforming catalyst to provide a reformate effluent stream; passing at least a portion of the reformate effluent stream to a debutanizer column of the reforming zone to provide a net hydrogen stream and a fraction comprising liquid petroleum gas (LPG); and recycling at least a portion of the net hydrogen stream to the reforming zone as the hydrogen stream. An embodiment of the invention is one, any or all of prior embodiments in this paragraph up through the first embodiment in this paragraph further comprising separating the reformate effluent stream in a separator to provide a reformate vapor stream and a reformate liquid stream; passing at least a portion of the reformate vapor stream and a stream from at least one the hydrocracking zone, the isomerization zone, and the transalkylation zone to a compressor to provide a compressed liquid stream; passing the compressed liquid stream and the reformate liquid stream to the debutanizer column of the reforming zone to provide a debutanizer column overhead stream and the fraction comprising LPG; and passing at least a portion of the debutanizer column overhead stream to the compressor along with the at least portion of the reformate vapor stream and the stream from at least one of the hydrocracking zone, the transalkylation zone, and the isomerization zone to provide the net hydrogen stream. An embodiment of the invention is one, any or all of prior embodiments in this paragraph up through the first embodiment in this paragraph, wherein the hydrogen stream is obtained from the hydrocracking zone, the process further comprising hydrocracking a first hydrocarbonaceous feed in a hydrocracking zone in the presence of a hydrocracking catalyst and hydrogen to provide a hydrocracked effluent stream; separating at least a portion of the hydrocracked effluent stream in a hydrocracking separator to provide a gas stream and a liquid stream; stripping at least a portion of the liquid stream in a stripping column to provide a stripped liquid stream and a stripping column off-gas stream comprising C6– hydrocarbons; and compressing the gas stream and the stripping column off-gas stream comprising C6– hydrocarbons in the compressor of the reforming zone to obtain the hydrogen stream. An embodiment of the invention is one, any or all of prior embodiments in this paragraph up through the first embodiment in this paragraph, wherein the hydrogen stream is obtained from the isomerization zone, the process further comprising isomerizing a p-xylene lean stream in an isomerization zone in the presence of an isomerization catalyst and hydrogen to provide an isomerized effluent stream; passing the isomerized effluent stream to a stripping column to provide an overhead stream comprising C7– hydrocarbons and a bottoms stream comprising C8+ hydrocarbons; and compressing at least a portion of the overhead stream comprising C7– hydrocarbons in the compressor of the reforming zone to obtain the hydrogen stream. An embodiment of the invention is one, any or all of prior embodiments in this paragraph up through the first embodiment in this paragraph, wherein the stripping column is a deheptanizer column. An embodiment of the invention is one, any or all of prior embodiments in this paragraph up through the first embodiment in this paragraph, wherein the hydrogen stream is obtained from the transalkylation zone, the process further comprising passing a hydrocarbonaceous feed comprising C7+ hydrocarbons to a transalkylation zone comprising a transalkylation catalyst to produce a transalkylation zone effluent stream; stripping at least a portion of the transalkylation zone effluent stream in a stripping column to provide a stripping column overhead stream and a stripping column bottoms stream; and compressing at least a portion of the stripping column overhead stream in the compressor of the reforming zone to obtain the hydrogen stream. An embodiment of the invention is one, any or all of prior embodiments in this paragraph up through the first embodiment in this paragraph, wherein the hydrocracking zone is a slurry hydrocracking zone. An embodiment of the invention is one, any or all of prior embodiments in this paragraph up through the first embodiment in this paragraph, wherein the reforming zone comprises a plurality of reaction zones in fluid communication with an interzone heater. An embodiment of the invention is one, any or all of prior embodiments in this paragraph up through the first embodiment in this paragraph, wherein the reforming catalyst comprises one or more of a noble metal selected from platinum, palladium, rhodium, ruthenium, osmium, and iridium. An embodiment of the invention is one, any or all of prior embodiments in this paragraph up through the first embodiment in this paragraph, wherein the stream from at least one of the hydrocracking zone, the isomerization zone, and the transalkylation zone is passed to the compressor which is a first stage compressor of a multistage compressor train. An embodiment of the invention is one, any or all of prior embodiments in this paragraph up through the first embodiment in this paragraph, wherein the first hydrocarbonaceous feed comprises one or more of vacuum gas oil (VGO), diesel, light cycle oil (LCO), heavy thermally cracked gas oil, kerosene, vacuum residue, and deasphalted oil (DAO). An embodiment of the invention is one, any or all of prior embodiments in this paragraph up through the first embodiment in this paragraph, wherein the gas stream is obtained from a cold flash drum of the hydrocracking separator. An embodiment of the invention is one, any or all of prior embodiments in this paragraph up through the first embodiment in this paragraph, wherein the gas stream comprises liquid petroleum gas and dissolved hydrogen. An embodiment of the invention is one, any or all of prior embodiments in this paragraph up through the first embodiment in this paragraph further comprising at least one of sensing at least one parameter of the integrated process for maximizing recovery of hydrogen and generating a signal or data from the sensing; generating and transmitting a signal; or generating and transmitting data.

A second embodiment of the invention is a process for maximizing recovery of hydrogen comprising providing a hydrocarbonaceous feed comprising naphtha, and a hydrogen stream to a reforming zone, wherein the hydrogen stream is obtained from at least one of a stripping column overhead of a hydrocracking zone, a stripping column overhead of an isomerization zone, and a stripping column overhead of a transalkylation zone; reforming the hydrocarbonaceous feed in the reforming zone in the presence of the hydrogen stream and a reforming catalyst to provide a reformate effluent stream; passing at least a portion of the reformate effluent stream to a debutanizer column of the reforming zone to provide a net hydrogen stream and a fraction comprising liquid petroleum gas (LPG); and recycling at least a portion of the net hydrogen stream to the reforming zone as the hydrogen stream. An embodiment of the invention is one, any or all of prior embodiments in this paragraph up through the second embodiment in this paragraph further comprising separating the reformate effluent stream in a separator to provide a reformate vapor stream and a reformate liquid stream; passing at least a portion of the reformate vapor stream, and at least one stream from the stripping column overhead of the hydrocracking zone, the stripping column overhead of the isomerization zone, and the stripping column overhead of the transalkylation zone to a multistage compressor train to provide a compressed liquid stream; passing the compressed liquid stream and the reformate liquid stream to the debutanizer column of the reform-ing zone to provide a debutanizer column overhead stream and the fraction comprising LPG; and passing the debutanizer column overhead stream to the multistage compressor train along with the at least portion of the reformate vapor stream, and the at least one stream from the stripping column overhead of the hydrocracking zone, the stripping column overhead of the isomerization zone, and the stripping column overhead of the transalkylation zone to provide the net hydrogen stream. An embodiment of the invention is one, any or all of prior embodiments in this paragraph up through the second embodiment in this paragraph, wherein the stripping column overhead of the isomerization zone is a deheptanizer column overhead of the isomerization zone.

A third embodiment of the invention is a process for maximizing recovery of hydrogen comprising providing a hydrocarbonaceous feed comprising naphtha, and a hydrogen stream to a reforming zone, wherein the hydrogen stream is obtained from at least one of a hydrocracking zone, a transalkylation zone, and an isomerization zone; reforming the hydrocarbonaceous feed in the reforming zone in the presence of the hydrogen stream and a reforming catalyst to provide a reformate effluent stream; passing at least a portion of the reformate effluent stream to a debutanizer column of the reforming zone to provide a net hydrogen stream and a fraction comprising liquid petroleum gas (LPG); and recycling at least a portion of the net hydrogen stream to the reforming zone as the hydrogen stream. An embodiment of the invention is one, any or all of prior embodiments in this paragraph up through the third embodiment in this paragraph further comprising separating the reformate effluent stream in a separator to provide a reformate vapor stream and a reformate liquid stream; passing at least a portion of the reformate vapor stream and at least one stream from the hydrocracking zone, the transalkylation zone, and the isomerization zone to a multistage compressor train to provide a compressed liquid stream; passing the compressed liquid stream and the reformate liquid stream to the debutanizer column of the reforming zone to provide a debutanizer column overhead stream and the fraction comprising LPG; and passing the debutanizer column overhead stream to the multistage compressor train along with the at least portion of the reformate vapor stream and the at least one stream from the hydrocracking zone, the transalkylation zone, and the isomerization zone to provide the net hydrogen stream. An embodiment of the invention is one, any or all of prior embodiments in this paragraph up through the third embodiment in this paragraph, wherein the debutanizer column overhead stream, the at least portion of the reformate vapor stream, and the at least one stream are passed to a first stage compressor of the multistage compressor train.

A fourth embodiment of the invention is an integrated for maximizing recovery of hydrogen, comprising reforming a hydrocarbonaceous feed comprising naphtha in a reforming zone in the presence of a reforming catalyst and a hydrogen stream to provide a reformate effluent stream; passing at least a portion of the reformate effluent stream to a debutanizer column of the reforming zone to provide a fraction comprising LPG and a debutanizer column overhead stream; and passing the debutanizer column overhead stream to a compressor to provide the hydrogen stream; and passing the hydrogen stream to the reforming zone; wherein the hydrogen stream is obtained from at least one of the following processes a hydrocracking process, an isomerization process, and a transalkylation process; wherein the hydrocracking process comprises hydrocracking a first hydrocarbonaceous feed in a hydrocracking zone in the presence of a hydrocracking catalyst and hydrogen to provide a hydrocracked effluent stream; separating at least a portion of the hydrocracked effluent stream in a separator to provide a gas stream and a liquid stream; stripping at least a portion of the liquid stream in a stripping column to provide a stripped liquid stream and a stripping column off-gas stream comprising $C_{6-}$ hydrocarbons; and passing the gas stream and the stripping column off-gas stream to the compressor to provide the hydrogen stream; wherein the isomerization process comprises passing a hydrocarbonaceous feed comprising $C_{8+}$ hydrocarbons to a xylene column to provide an overhead stream comprising a mixture of xylenes and a bottoms stream comprising $C_{9+}$ hydrocarbons; separating p-xylene from the overhead stream comprising the mixture of xylenes to provide a p-xylene lean stream; isomerizing the p-xylene lean stream in an isomerization zone in the presence of an isomerization catalyst and hydrogen to provide an isomerized effluent stream; passing the isomerized effluent stream to a stripping column to provide an overhead stream comprising $C_{7-}$ hydrocarbons and a bottoms stream comprising $C_{8+}$ hydrocarbons; and passing the overhead stream to the compressor to provide the hydrogen stream, or the transalkylation process comprises passing a hydrocarbonaceous feed comprising $C_{7+}$ hydrocarbons to a transalkylation zone comprising a transalkylation catalyst to produce a transalkylation zone effluent stream; stripping at least a portion of the transalkylation zone effluent stream in a stripping column to provide a stripping column overhead stream and a stripping column bottoms stream; and passing the stripping column overhead stream to the compressor to provide the hydrogen stream. An embodiment of the invention is one, any or all of prior embodiments in this paragraph up through the fourth embodiment in this paragraph further comprising passing the isomerized effluent stream to a deheptanizer column to provide the overhead stream comprising $C_{7-}$ hydrocarbons and the bottoms stream comprising $C_{8+}$ hydrocarbons. An embodiment of the invention is one, any or all of prior embodiments in this paragraph up through the fourth embodiment in this paragraph, wherein obtaining the hydrogen stream comprises separating the reformate effluent stream in a separator to provide a reformate vapor stream and a reformate liquid stream; compressing at least a portion of the reformate vapor stream to provide a compressed liquid stream; passing the compressed liquid stream and the reformate liquid stream to the debutanizer column of the reforming zone to provide a debutanizer column overhead stream and the fraction comprising LPG; and passing the at least portion of the reformate vapor stream, the debutanizer column overhead stream and at least one of the gas stream, the stripping column off-gas stream comprising $C_{6-}$ hydrocarbons, the overhead stream comprising $C_{7-}$ hydrocarbons, and the stripping column overhead stream to a multistage compressor train to provide the compressed liquid stream and the hydrogen stream.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. An integrated process for maximizing recovery of hydrogen comprising:
    a) providing a hydrocarbonaceous feed comprising naphtha, and a hydrogen stream to a reforming zone, wherein the hydrogen stream is obtained from at least one of a hydrocracking zone, an isomerization zone, and a transalkylation zone;
    b) reforming the hydrocarbonaceous feed in the reforming zone in the presence of the hydrogen stream and a reforming catalyst to provide a reformate effluent stream;
    c) passing at least a portion of the reformate effluent stream to a debutanizer column of the reforming zone to provide a net hydrogen stream and a fraction comprising liquid petroleum gas (LPG); and
    d) recycling at least a portion of the net hydrogen stream to the reforming zone.

2. The process of claim 1 further comprising:
    separating the reformate effluent stream in a separator to provide a reformate vapor stream and a reformate liquid stream;
    passing at least a portion of the reformate vapor stream and a hydrogen stream from at least one of the hydrocracking zone, the isomerization zone, and the transalkylation zone to a compressor to provide a compressed liquid stream;
    passing the compressed liquid stream and the reformate liquid stream to the debutanizer column of the reforming zone to provide a debutanizer column overhead stream and the fraction comprising LPG; and
    passing at least a portion of the debutanizer column overhead stream to the compressor along with the at least portion of the reformate vapor stream and the stream from at least one of the hydrocracking zone, the transalkylation zone, and the isomerization zone to provide the net hydrogen stream.

3. The process of claim 1, wherein the hydrogen stream is obtained from the hydrocracking zone, the process further comprising:
    hydrocracking a first hydrocarbonaceous feed in a hydrocracking zone in the presence of a hydrocracking catalyst and hydrogen to provide a hydrocracked effluent stream;
    separating at least a portion of the hydrocracked effluent stream in a hydrocracking separator to provide a gas stream and a liquid stream;
    stripping at least a portion of the liquid stream in a stripping column to provide a stripped liquid stream and a stripping column off-gas stream comprising $C_{6-}$hydrocarbons; and
    compressing the gas stream and the stripping column off-gas stream comprising $C_{6-}$hydrocarbons in the compressor of the reforming zone to obtain the hydrogen stream.

4. The process of claim 2, wherein the hydrogen stream is obtained from the isomerization zone, the process further comprising:
    isomerizing a p-xylene lean stream in an isomerization zone in the presence of an isomerization catalyst and hydrogen to provide an isomerized effluent stream;

passing the isomerized effluent stream to a stripping column to provide an overhead stream comprising $C_7$_hydrocarbons and a bottoms stream comprising $C_{8+}$hydrocarbons; and compressing at least a portion of the overhead stream comprising $C_7$_hydrocarbons in the compressor of the reforming zone to obtain the hydrogen stream.

5. The process of claim 4, wherein the stripping column is a deheptanizer column.

6. The process of claim 2, wherein the hydrogen stream is obtained from the transalkylation zone, the process further comprising:

passing a hydrocarbonaceous feed comprising $C_{7+}$hydrocarbons to a transalkylation zone comprising a transalkylation catalyst to produce a transalkylation zone effluent stream;

stripping at least a portion of the transalkylation zone effluent stream in a stripping column to provide a stripping column overhead stream and a stripping column bottoms stream; and compressing at least a portion of the stripping column overhead stream in the compressor of the reforming zone to obtain the hydrogen stream.

7. The process of claim 1, wherein the hydrocracking zone is a slurry hydrocracking zone.

8. The process of claim 1, wherein the reforming zone comprises a plurality of reaction zones in fluid communication with an interzone heater.

9. The process of claim 1, wherein the reforming catalyst comprises one or more of a noble metal selected from platinum, palladium, rhodium, ruthenium, osmium, and iridium.

10. The process of claim 2, wherein the stream from at least one of the hydrocracking zone, the isomerization zone, and the transalkylation zone is passed to the compressor which is a first stage compressor of a multistage compressor train.

11. The process of claim 3, wherein the first hydrocarbonaceous feed consists of one or more of vacuum gas oil (VGO), diesel, light cycle oil (LCO), heavy thermally cracked gas oil, kerosene, vacuum residue, and deasphalted oil (DAO).

12. The process of claim 3, wherein the gas stream is obtained from a cold flash drum of the hydrocracking separator.

13. The process of claim 3, wherein the gas stream comprises liquid petroleum gas and dissolved hydrogen.

14. The process of claim 1 further comprising at least one of:

sensing at least one parameter of the integrated process for maximizing recovery of hydrogen and generating a signal or data from the sensing;

generating and transmitting a signal; or generating and transmitting data.

15. An integrated process for maximizing recovery of hydrogen comprising:

a) providing a hydrocarbonaceous feed comprising naphtha, and a hydrogen stream to a reforming zone, wherein the hydrogen stream is obtained from at least one of a stripping column overhead of a hydrocracking zone, a stripping column overhead of an isomerization zone, and a stripping column overhead of a transalkylation zone;

b) reforming the hydrocarbonaceous feed in the reforming zone in the presence of the hydrogen stream and a reforming catalyst to provide a reformate effluent stream;

c) passing at least a portion of the reformate effluent stream to a debutanizer column of the reforming zone to provide a net hydrogen stream and a fraction comprising liquid petroleum gas (LPG); and d) recycling at least a portion of the net hydrogen stream to the reforming zone.

16. The process of claim 15 further comprising:

separating the reformate effluent stream in a separator to provide a reformate vapor stream and a reformate liquid stream;

passing at least a portion of the reformate vapor stream, and at least one stream from the stripping column overhead of the hydrocracking zone, the stripping column overhead of the isomerization zone, and the stripping column overhead of the transalkylation zone to a multistage compressor train to provide a compressed liquid stream;

passing the compressed liquid stream and the reformate liquid stream to the debutanizer column of the reforming zone to provide a debutanizer column overhead stream and the fraction comprising LPG; and passing the debutanizer column overhead stream to the multistage compressor train along with the at least a portion of the reformate vapor stream, and the at least one stream from the stripping column overhead of the hydrocracking zone, the stripping column overhead of the isomerization zone, and the stripping column overhead of the transalkylation zone to provide the net hydrogen stream.

17. The process of claim 15, wherein the stripping column overhead of the isomerization zone is a deheptanizer column overhead of the isomerization zone.

18. An integrated process for maximizing recovery of hydrogen comprising:

a) providing a hydrocarbonaceous feed comprising naphtha, and a hydrogen stream to a reforming zone, wherein the hydrogen stream is obtained from at least one of a hydrocracking zone, a transalkylation zone, and an isomerization zone;

b) reforming the hydrocarbonaceous feed in the reforming zone in the presence of the hydrogen stream and a reforming catalyst to provide a reformate effluent stream;

c) passing at least a portion of the reformate effluent stream to a debutanizer column of the reforming zone to provide a net hydrogen stream and a fraction comprising liquid petroleum gas (LPG);

d) recycling at least a portion of the net hydrogen stream to the reforming zone;

e) separating the reformate effluent stream in a separator to provide a reformate vapor stream and a reformate liquid stream;

f) passing at least a portion of the reformate vapor stream and at least one stream from the hydrocracking zone, the transalkylation zone, and the isomerization zone to a multistage compressor to provide a compressed liquid stream;

g) passing the compressed liquid stream and the reformate liquid stream to the debutanizer column of the reforming zone to provide a debutanizer column overhead stream and the fraction comprising LPG; and h) passing the debutanizer column overhead stream to the multistage compressor train along with the at least portion of the reformate vapor stream and the at least one stream from the hydrocracking zone, the transalkylation zone, and the deheptanizer column overhead of the isomerization zone to provide the net hydrogen stream.

19. The process of claim 18, wherein the debutanizer column overhead stream, the at least portion of the reformate vapor stream, and the at least one stream are passed to a first stage compressor of the multistage compressor train.

20. The process of claim 18, wherein the reforming zone comprises a plurality of reaction zones in fluid communication with an interzone heater.

* * * * *